United States Patent [19]

Anisic

[11] 4,124,307
[45] Nov. 7, 1978

[54] HOMOGENIZER FOR VISCOUS MATERIALS

[75] Inventor: Ladislav Anisic, Seevetal, Fed. Rep. of Germany

[73] Assignee: Fried. Krupp GmbH, Essen, Fed. Rep. of Germany

[21] Appl. No.: 816,691

[22] Filed: Jul. 18, 1977

[30] Foreign Application Priority Data

Jul. 17, 1976 [DE] Fed. Rep. of Germany ....... 2632335

[51] Int. Cl.² .............................................. B29B 1/06
[52] U.S. Cl. ....................................... 366/76; 366/83; 366/91; 366/96; 366/147; 366/149; 366/241
[58] Field of Search ....................... 366/76, 79, 83, 91, 366/96, 97, 98, 99, 241, 287, 288; 425/204, 205, 207, 208, 209

[56] References Cited

U.S. PATENT DOCUMENTS

| | | | |
|---|---|---|---|
| 3,530,534 | 9/1970 | Pomper | 425/208 X |
| 3,746,489 | 7/1973 | Rizzi et al. | 425/204 X |

FOREIGN PATENT DOCUMENTS

| | | | |
|---|---|---|---|
| 2,454,478 | 7/1975 | Fed. Rep. of Germany | 425/205 |
| 2,537,912 | 3/1977 | Fed. Rep. of Germany | 425/207 |
| 82,557 | 6/1971 | German Democratic Rep. | 259/191 |
| 513,380 | 2/1955 | Italy | 425/205 |

*Primary Examiner*—Philip R. Coe
*Attorney, Agent, or Firm*—Karl F. Ross

[57] ABSTRACT

A highly viscous mass to be homogenized is fed from a screw plasticizer into a mixing chamber, perpendicular to the plasticizer mouth, in which a mandrel rotates independently of the plasticizer screw to masticate the mass in a narrow annular clearance between itself and the chamber wall. The mass, force-fed through this clearance by the screw pressure, encounters several sets of free-floating balls or other rotary bodies loosely guided in annular grooves of the chamber wall, or of the mandrel, while revolving about the mandrel axis. The mandrel may have a screw-threaded rearward extension for admixing additional ingredients from one or more further chamber inlets with the mass to be homogenized, with exertion of a back-up pressure upon that mass. The chamber temperature may be controlled by the circulation of a cooling fluid through its wall and/or through the mandrel.

10 Claims, 3 Drawing Figures

HOMOGENIZER FOR VISCOUS MATERIALS

FIELD OF THE INVENTION

My present invention relates to a device for homogenizing highly viscous composite materials, such as plasticized synthetic resins used for extrusion or injection molding with or without the admixture of additional substances.

BACKGROUND OF THE INVENTION

The several components of such a viscous mass, when force-fed through a mixing chamber, move because of their low Reynolds numbers in essentially laminar flows separated by more or less definite interfaces. An intermixing of these components, therefore, requires a breakup of the laminar flow by the generation of shear forces of a magnitude depending upon such parameters as feed pressure and flow temperature. Conventional agitators, which are effective with low-viscosity fluids, cannot be used to destroy the bonds between particles of highly viscous masses such as those here contemplated.

OBJECTS OF THE INVENTION

The general object of my present invention, therefore, is to provide a homogenizer for viscous mixtures of two or more components which is highly effective with plasticized synthetic resins or the like regardless of their feed rate.

Another object is to provide means in such a device for conveniently admixing one or more additives with the mass to be homogenized.

SUMMARY OF THE INVENTION

A homogenizer according to my invention comprises a cylindrical chamber whose wall is provided with an inlet and an outlet for the introduction and the discharge of the viscous material at locations spaced apart along the cylinder axis. These locations are interconnected by an annular clearance formed between confronting peripheral surfaces of the chamber wall and of a rotatable mandrel coaxially mounted therein, that clearance containing one or more sets of rotary bodies which are floatingly disposed therein and are provided with guide means for maintaining them within a predetermined axial zone of the chamber. As the material is force-fed to the inlet under a pressure sufficient to drive it to the outlet past the preferably spherical rotary bodies, the latter (referred to hereinafter for simplicity as balls) are frictionally entrained by the rotating mandrel to revolve about the cylinder axis together with the mass itself. Since the chamber wall forming the outer boundary of the annular clearance is stationary, the viscous mass advancing through that clearance is given a rotary flow component which ranges from zero at its outermost layer to a value near the peripheral velocity of the mandrel at its innermost layer. This linearly varying peripheral velocity component sets each ball in rotation about an axis parallel to that of the cylinder, resulting in a relative motion between the ball surface and the mass which disrupts the laminar flow of the latter and intensifies the intermingling of its particles. The rate of homogenization is determined primarily by the rotary speed of the mandrel and can thus be optimized independently of the throughput rate.

BRIEF DESCRIPTION OF THE DRAWING

The above and other features of my invention will now be described in detail with reference to the accompanying drawing in which.

SPECIFIC DESCRIPTION

Figure 1:
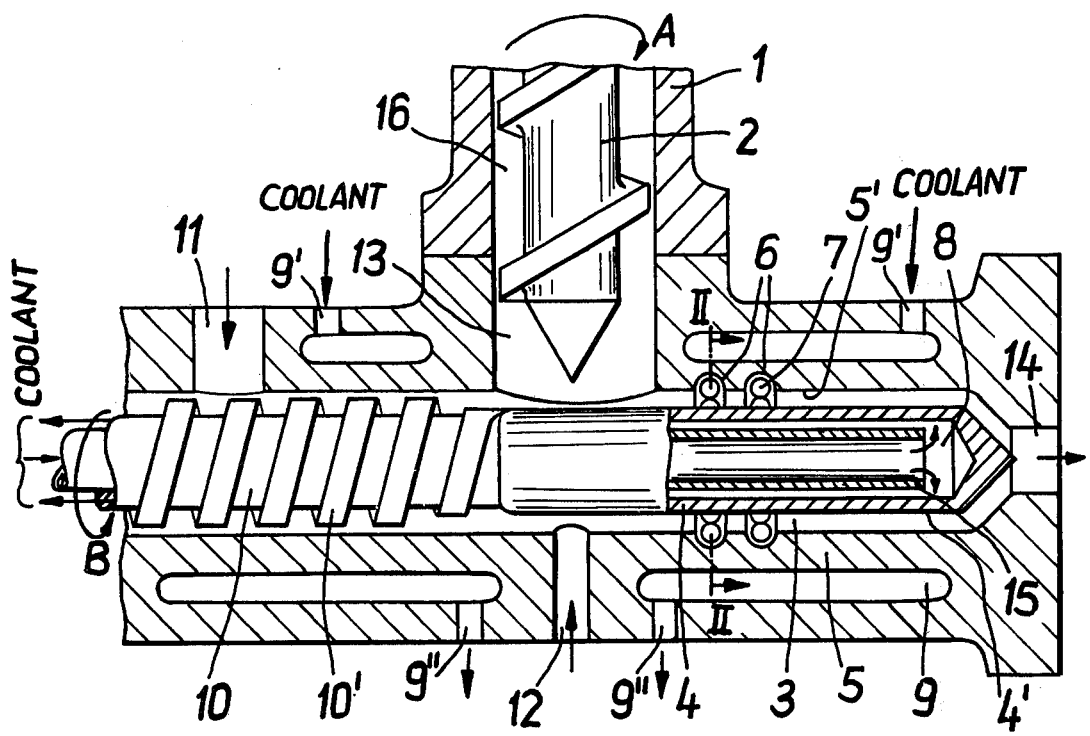
FIG. 1 is an axial sectional view of a homogenizer embodying my invention.

In FIG. 1 I have shown the essential parts of a homogenizer according to my invention, comprising a housing with walls 1 and 5 defining a pair of cylindrical chambers having mutually perpendicular axes, namely an extruder chamber 16 and a mixing chamber 3. A worm 2 in extruder chamber 16, serving as a plasticizer, is driven by a nonillustrated motor as indicated by an arrow A; a mandrel 4 in mixing chamber 3 is driven by the same or a different motor, at a speed adjustable independently of that of worm 2, as indicated by an arrow B. Worm 2 terminates at a lateral inlet 13 of chamber wall 5 which is provided with an outlet 14 axially separated from that inlet; the sense of rotation of worm 2 is such as to feed a highly viscous composite mass — here specifically a plasticized synthetic resin — via inlet 13 into the chamber 3 which forms an annular clearance, bounded by a peripheral mandrel surface 4' and a peripheral wall surface 5' (cf. FIG. 3), between inlet 13 and outlet 14. Chamber 3 continues rearwardly, i.e. in a direction away from outlet 14, and is closed at the nonillustrated opposite end of the housing. An extension 10 of mandrel 4 is provided with screw threads 10' which, with the indicated direction B of rotation, generates a back-up pressure directed toward outlet 14 within the chamber. That back-up pressure can also be used to admix reactants or other additives, admitted into the chamber via ancillary entrances 11 and 12, with the plasticized material coming in from extruder 1, 2. No screw threads or other projecting formations are present on the cylindrical mandrel surface 4' between inlet 13 and outlet 14.

Figure 2:
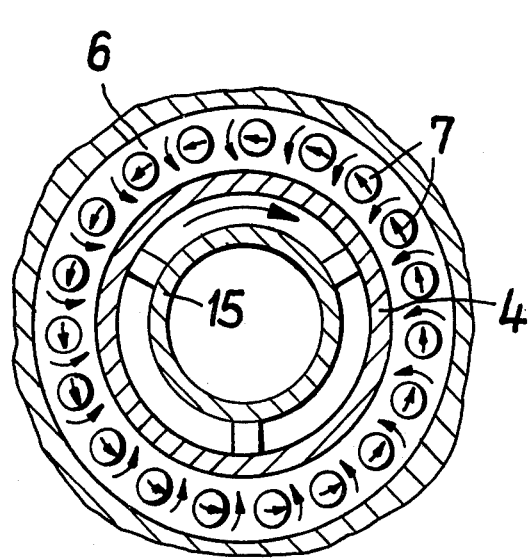
FIG. 2 is a partial cross-sectional view taken on the line II—II of FIG. 1 but drawn to a larger scale.

In accordance with my present invention, and as clearly seen in FIGS. 1 and 2, two sets of balls 7 (e.g. of steel) are floatingly disposed in the clearance between peripheral surfaces 4' and 5', the balls being partly received in annular guide grooves 6 whose downstream edges hold them against axial entrainment toward outlet 14. With a mandrel 4 of sufficient wall thickness, such guidance grooves could also or alternatively be provided in surface 4'. The number and the diameter of these balls is so chosen that they are well separated from one another along their orbital path even though, of course, they will generally not constitute an equispaced annular array as schematically indicated in FIG. 2.

In order to control the temperature prevailing in chamber 3, I prefer to provide both the mandrel 4 and the wall 5 with internal channels 8 and 9 for the circulation of a cooling fluid which passes close enough to the annular clearance between surfaces 4' and 5' to dissipate a significant part of the heat generated by the mixing process. The coolant enters the channel 8 through a tubular core 15 within mandrel 4 and leaves it through annular passages formed between the core 15 and the mandrel proper. Channels 9 have entrance ports 9' and exit ports 9" for the cooling fluid.

Figure 3:
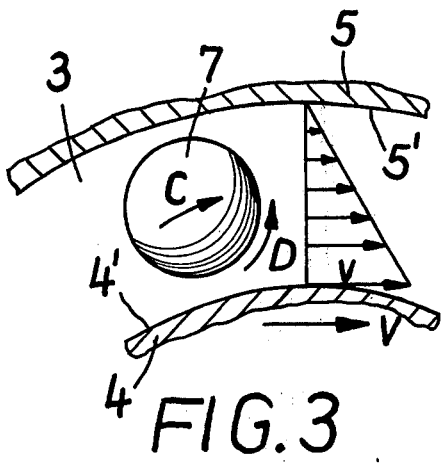
FIG. 3 is a further-enlarged, somewhat diagrammatic view of a portion of the assembly seen in FIG. 2.

As diagrammatically illustrated in FIG. 3, the rotation of mandrel 4 relative to chamber wall 5 at a peripheral speed V imparts to successive layers of the mass within chamber 3 a peripheral velocity component decreasing linearly from V at surface 4' to zero at surface 5'. This component results, on the one hand, in a revolution of each ball 7 about the chamber axis, as indicated by an arrow C, and, on the other hand, in a rotation of the ball about an individual axis as indicated by an arrow D. Thus, the ball surface moves at different relative speeds to the surrounding mass so as to create pressure differentials which generate local stresses tending to break the cohesion of its particles whereby the various components of the mass are thoroughly intermixed. Naturally, the number of sets of balls 7 could be increased beyond the two sets illustrated.

I claim:

1. A homogenizer for composite viscous materials, comprising:
   a cylindrical chamber having a wall provided with an inlet and an outlet spaced apart along the cylinder axis;
   a rotatable mandrel coaxially mounted in said chamber, said wall and said mandrel having confronting substantially cylindrical peripheral surfaces separated by an annular clearance extending from said inlet substantially to said outlet, said mandrel being devoid of any formation projecting into said clearance;
   at least one set of rotary bodies floatingly disposed in said clearance and provided with guide means for maintaining said bodies within a predetermined axial zone of said chamber; and
   feed means for delivering viscous material to be homogenized to said inlet under a pressure sufficient to drive said material past said rotary bodies through said clearance to said outlet at a rate independent of the rotary speed of said mandrel.

2. A homogenizer as defined in claim 1 wherein said guide means comprises an edge of an annular groove formed in at least one of said peripheral surfaces.

3. A homogenizer as defined in claim 2 wherein said groove is formed in said wall.

4. A homogenizer as defined in claim 1 wherein said feed means comprises an extruder with a worm terminating at said inlet, said worm and said mandrel being provided with drive means for rotating same independently of each other.

5. A homogenizer as defined in claim 4 wherein said worm has an axis perpendicular to that of said mandrel.

6. A homogenizer as defined in claim 1 wherein said inlet opens laterally into said chamber at an intermediate location of said wall, said mandrel having a rearward extension beyond said inlet provided with screw threads for generating a back-up pressure toward said outlet.

7. A homogenizer as defined in claim 6 wherein said wall is provided with at least one ancillary entrance in the region of said extension for feeding in an additive to be admixed with said material by said screw threads.

8. A homogenizer as defined in claim 1, further comprising heat-control means for stabilizing the temperature of said material in said chamber.

9. A homogenizer as defined in claim 8 wherein said heat-control means comprises a source of cooling fluid circulated through a channel in the vicinity of said clearance.

10. A homogenizer as defined in claim 1 wherein said bodies are spherical.

* * * * *